(12) United States Patent
Radigan

(10) Patent No.: US 6,738,967 B1
(45) Date of Patent: May 18, 2004

(54) COMPILING FOR MULTIPLE VIRTUAL MACHINES TARGETING DIFFERENT PROCESSOR ARCHITECTURES

(75) Inventor: James J. Radigan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/524,440

(22) Filed: Mar. 14, 2000

(51) Int. Cl.$^7$ ................................................. G06F 9/45
(52) U.S. Cl. ....................................................... 717/146
(58) Field of Search ................................ 717/103, 106, 717/118, 101, 132, 137, 139, 140, 145, 148, 151, 157, 159, 162

(56) References Cited

U.S. PATENT DOCUMENTS

| | | | | |
|---|---|---|---|---|
| 5,151,991 A | * | 9/1992 | Iwasawa et al. | 717/150 |
| 5,280,613 A | * | 1/1994 | Chan et al. | 717/147 |
| 5,339,419 A | * | 8/1994 | Chan et al. | 717/147 |
| 5,448,737 A | * | 9/1995 | Burke et al. | 717/146 |
| 5,901,315 A | * | 5/1999 | Edwards et al. | 717/124 |
| 6,151,706 A | * | 11/2000 | Lo et al. | 717/155 |
| 6,182,284 B1 | * | 1/2001 | Sreedhar et al. | 717/146 |
| 6,253,370 B1 | * | 6/2001 | Abadi et al. | 717/154 |
| 6,301,704 B1 | * | 10/2001 | Chow et al. | 717/146 |

OTHER PUBLICATIONS

Alfred Aho, Compilers, Principles, Techniques and Tools, Sep. 12, 1985, Addison–Wesley, pp. 463–511,585–718.*
Steven S. Muchnick, Advanced Compiler Design Implementation, 1997, Morgan Kaufmann Publishers, pp. 139, 149, 141,377, 435–443, 445, 447, 500, 559.*
Johnson, A., et al., "The ANDF Technology Program at the OSF RI", *Open Software Foundation*, Jun. 29, 1993 04:55 pm andyj@osf.org, 1–6, (Dec. 8, 1992).

Peeling, D., et al., "ANDF Features and Benefits", *British Crown Copyright 1992*, Feb. 5, 1993 02:12 p.m., 1–9, (1992).

\* cited by examiner

*Primary Examiner*—Wei Zhen
(74) *Attorney, Agent, or Firm*—Woodcock Washburn LLP

(57) ABSTRACT

A developer's system compiles a source-language program by parsing it into an intermediate language (IL) program that is independent of the architecture or resources of any particular processor. This system generates a set of machine independent annotations that record attributes and structure of the IL program such as variable definitions and uses. The annotations are in the form of a unique graph structure. Further annotations are used to associate the machine specific optimization information with each of many different microprocessors. The IL program and all the annotations are distributed to multiple user systems having mutually different virtual machines that translate the IL program into object language for their respective different processors. Optimizers in the virtual machines select graph edges based on the machine specific annotations to generate an optimized object program. The translators are table-driven. Entities in the IL program are keyed to entries in a replaceable table in each virtual machine.

74 Claims, 10 Drawing Sheets

301 — p = a ⊕ b + c
302 — x =
303 — y =
304 — = **r
305 — *q =
306 — call foo( )
307 — = **r
308 — g = a ⊕ b + k

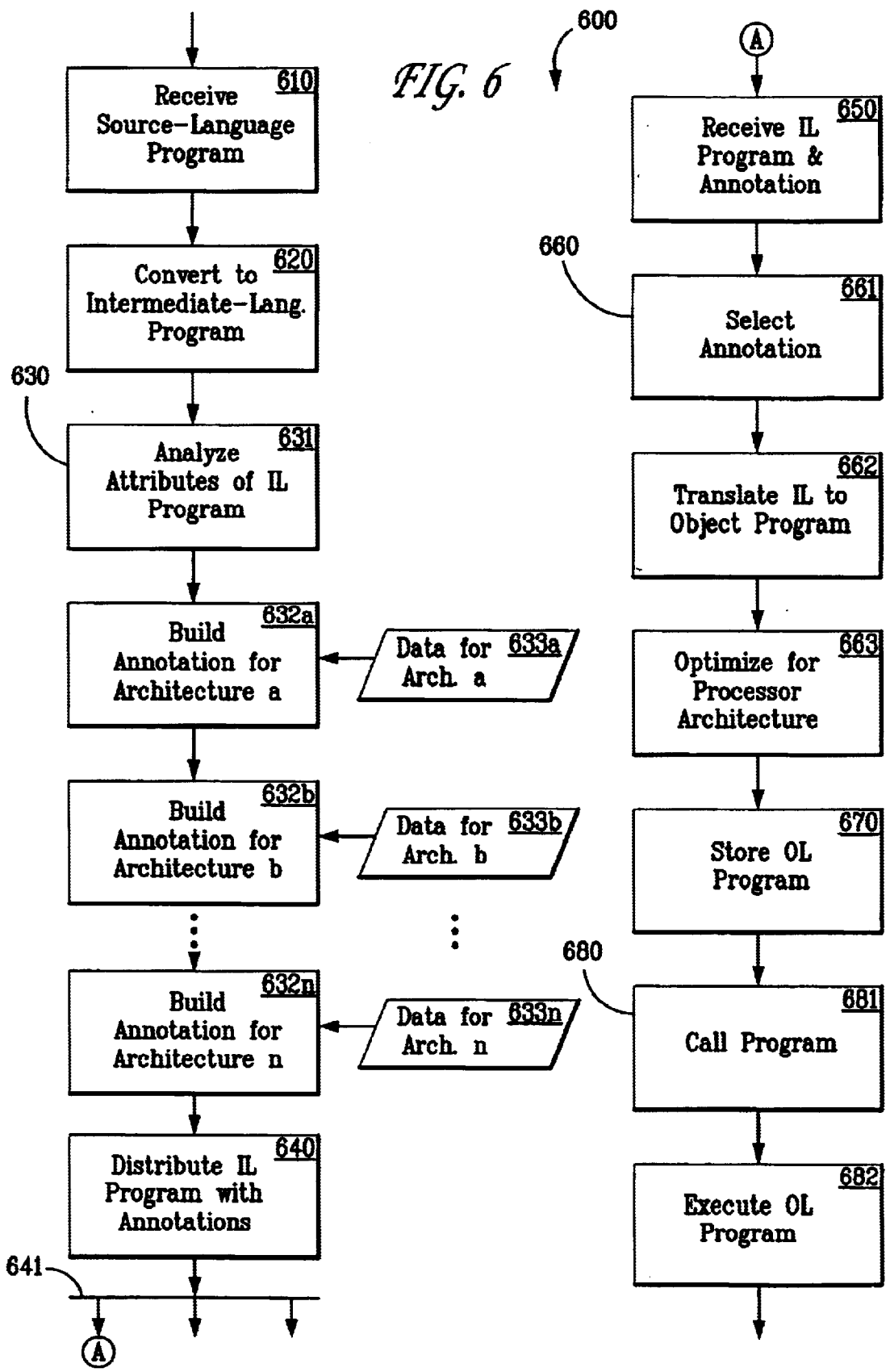

COMPILING FOR MULTIPLE VIRTUAL MACHINES TARGETING DIFFERENT PROCESSOR ARCHITECTURES

TECHNICAL FIELD

The present invention relates to electronic data processing, and more particularly concerns the compilation of source programs into object programs for execution on processors having multiple different architectures.

BACKGROUND

Fully optimizing a source program during the traditional compilation process for one specifically targeted computer architecture is difficult. Optimizing a program to run on many processors having vastly differing architectures is at best, only currently approximated in the current art. Additionally, optimization techniques that obtain peak performance on one specific architecture frequently can degrade the performance on other processors potentially, to a degree, that no optimization (at all) would be better. Today, a single source-code program is compiled to multiple versions of machine specific, executable, code. These "executables" contain machine specific code that has been uniquely optimized for each different processor the compiler can target. Each version of these "executables" requires separate handling, packaging, tracking, distribution, and upgrading. Alternatively, conventional interpreted programs such as Java run a single version of a universally executable code on different host processors using virtual machines. The virtual machines translate the universal executable into target specific machine code. These interpretive virtual machines see only one "byte-code" instruction at a time, whereas most optimization techniques are global, taking into consideration a context including many or all of the instructions before and/or after the current instruction. The traditional alternative, to these interpretive engines, requires distributing a program directly in source-code format for compilation and optimization by users. This has serious disadvantages and costs Almost all computer programs begin life as source code written in a high-level language such as C++ or BASIC. A compiler then converts the source code into object code comprising low-level operations that can be directly executed in a specific processor engine such as the Intel Corp. Pentium® or the Digital Equipment Corp. Alphas microprocessors.

High-level languages allow programmers to write code without bothering with the details of how the high-level operations will be executed in a specific processor or platform. This feature also makes them largely independent of the architectural details of any particular processor. Such independence is advantageous in that a programmer can write one program for many different processors, without having to learn how any of them actually work. The single source program is merely run through a separate compiler for each processor. Because the compiler knows the architecture of the processor it was designed for, it can optimize the object code of the program for that specific architecture. Strategically placing intermediate calculations in registers (if they are available in the target processor) is much faster than storing and reloading them from memory. Different processors can vary greatly in the number of register available. Some processors permit out of order instruction execution and provide different address modes or none at all. Register renaming is permitted in some processors, but not in others. Parallel instruction execution can also differ greatly between different processors. Unrolling loops and pulling loop invariant loads and calculations out of loops are also known optimization techniques that cannot be employed profitably without knowledge of the available resources (i.e. registers) on each specific target processor. Also, some processors include facilities for instruction-level parallelism (ILP) that must be explicitly scheduled by the compiler versus other processors where ILP is exploited via greedy out-of-order hardware techniques. The most common approach is to compile the same source program separately for many different processors, optimizing different source versions for each specific target processor in order to best exploit the available registers and available ILP. This allows very machine specific optimization, but incurs an implicit overhead at great cost to the developer and software manufacturer. A program developer must produce, distribute, maintain, and upgrade multiple versions of the program. New or improved processors require the development and distribution of additional versions. This versioning problem is a significant cost in terms of bug fixes, upgrades and documentation. The versioning "tax" continues for the life of the product and can actually cause a product to fail in the market place due to a lack of profitability as a result of these hidden costs.

The versioning problem could be avoided altogether by distributing the original processor-independent source code itself This presents many problems. Different users might customize the source code in unusual and unanticipated ways. Distributing source code requires users to purchase a compiler and learn how to use it. Compilers of the type employed for major programs are large, expensive, and hard to use. Direct interpretation of high-level source code (e.g., BASIC and APL) is also possible, but is slow and wasteful of processor resources. Attempts in the 1970s to design processor architectures for direct hardware execution of high-level languages met with little success. Moreover, any public distribution of source code reveals information that enables unauthorized modification and other undesired uses of the code. For a number of reasons, the great majority of personal-computer application programs are fully compiled and shipped in the form of machine specific, object code, only.

Some languages are designed to be parsed to an intermediate language (IL) which contains machine instructions for an abstract virtual machine that is distributed to all users regardless of the architecture of the target processor they own. Programs in the Java language, for example, are distributed in a tokenized intermediate language called "byte codes." Each user's computer, has an instantiation of the virtual machine that translates each byte-code of an IL program individually to a sequence target specific hardware instructions in real time as the developers program is executed. Because different virtual machines are available for different specific processors, a single intermediate-level program can be distributed for many different processor architectures. Current implementations of the idea for one universal instruction set that can run on any target processor or microprocessor have major performance problems. Since the IL is the same for every processor that it runs on, it is too generic to allow the target-specific translators to filly optimize the IL and thus they fail to create machine instructions that are even close to the quality of code produced by a conventional compiler that generates machine specific code for each specific target processor. Additionally, optimizations attempted for one target processor often exact a penalty on a different processor so severe, that it may nullify the benefit of performing any optimization at all. For example, consider a calculation whose result is used several times in a program. Doing the calculation once and saving the result to a register, greatly speeds the performance of a processor that has enough physical registers to hold that result until it is needed again. A processor having fewer registers may accept the register assignment, but store (i.e., spill) the register contents to memory when the translated machine instructions of the program try to use more registers than are physically implemented. Spilling the contents of registers to memory and, then reloading them where the values are required for reuse, can be slower than actually recalculating the value. On some architectures, no optimization at all—merely throwing away the result and actually redoing the calculation later—results in code that runs significantly faster than an inappropriate attempt at optimization. This same strategy would be disastrous on a target processor where registers are plentiful Thus, creating a process/method in a system that attains the goals of 1.) highly optimized, machine specific performance and 2.) one, single distributed version that's executable on many different target processor architectures, has remained a significantly unsatisfied goal.

SUMMARY OF THE INVENTION

A version of an executable program is created that can be highly optimized, in a machine specific manner, rapidly, for many different processors with disparate architectural features. This is accomplished by annotating abstract instructions in the one executable, with an embedded graph structure which is processor independent. The graph uniquely encodes complex relationships between operands and operations in the one executable program.

The executable program is then distributed to multiple different systems. Every system that can execute this type of program uses a light weight (i.e., rapid) translator that produces machine specific code optimized by use of the embedded graph structure for that system. Sets of machine specific annotations are also provided to specifically identify use of the graph to optimize the program for such machines. The optimized program or code is then executed on that processor's specific hardware.

The embedded graph is in a static single assignment form that is known in the art as SSA. The static single assignment form has been extended to incorporate complex memory references and machine operations as reaching definition sites for certain uses, which is then embed in abstract instructions that form the single executable that is distributed. SSA is used as a particular form because it guarantees that every abstract definition point in a program is unique and every use that is incorporated in the graph has one and only one, dominating definition. These properties of SSA allow edges in the graph to be easily labeled with instructions for the lightweight translation process on the different target processors in systems. The edges provide information to accomplish three classic types of optimizations. Information is provided by the edges and processor unique annotations to enable global redundancy elimination, loop optimization and scheduling machine instructions to exploit parallelism. Further edges provide information to constrain the optimizations. These edges comprise anti dependence in a region, and output dependence in a region.

The target specific translation process uses the embedded graph in the abstract instructions of the single executable, to produce highly efficient code (final hardware instructions) that is unique to the specific architecture the translator resides on. This allows for one version of a program to run with peak performance on both a processor with eight registers, or a processor with 128 registers.

A development system, according to the invention, compiles (i.e., converts) a textual, source-code program into an intermediate-language (IL) or tokenized form of low-level instructions for an abstract machine, and provides information in edges of the graph, concerning complex relationships between operands and operators in that IL. The IL program itself is independent of any particular processor or architecture and contains processor independent constructs, in the form of annotations or information, that are incorporated into the SSA-based graph edges. Processor specific annotations are also provided, which "identify" possible, legal, profitable, machine specific, optimizations identified in the edges, that should be performed when the IL program is translated for a specific hardware target.

The one IL program which includes the information containing graph edges, and its processor specific annotations are distributed to multiple users who may employ microprocessors each with significantly disparate internal architectures. Each user system includes an optimizing translator (i.e., virtual machine) specific to its own target microprocessor. These translators are specific in that they contain machine specific knowledge that is specific only to that target. Examples of this knowledge would be numbers of registers, machine instruction types and the techniques that the target employs to exploit instruction level parallelism.

During translation, the virtual machine examines the annotations and identifies which optimizations are best suited for that one particular processor architecture where the virtual machine resides and applies the identified optimizations encoded by the edges in the embedded graph so as to highly optimize the final machine program in a global manner with the goal of obtaining peak performance.

Additionally, this process\method is powerful enough, that if the processor where the virtual machine resides is not specifically identified in the annotations, it is possible for the virtual machine to examine the constructs in the IL, in combination with the annotations, and still identify most profitable, machine or processor specific, target optimizations. Although generation of the graph edges and the processor specific annotations requires time at the initial compilation stage, use of pre-written annotations allows virtual machines in the users' systems to operate very quickly, often in a just-in-time manner. This is due to the fact that the edges and annotations compactly and efficiently encode costly global alias information that could take hours of initial compile time to generate. Thus potential hours of complex analysis is captured in one single IL program that can then be translated in seconds, optimally, in a processor specific manner, for many different microprocessors.

DESCRIPTION OF THE DRAWINGS

FIG. 3 is a portion of an example source-code listing for illustrating construction of graph edges.

FIG. 4 is a portion of an illustrative graph for the source-code listing of FIG. 3.

FIG. 6 is a flowchart showing the operation of the system of FIG. 2.

DETAILED DESCRIPTION

This description and the accompanying drawing illustrate specific examples of embodiments in which the present invention can be practiced, in sufficient detail to allow those skilled in the art to understand and practice the invention. Other embodiments, including logical, electrical, and mechanical variations, are within the skill of the art. Skilled artisans will also recognize features and advantages of the invention other than those explicitly set forth. The scope of the invention is to be defined only by the appended claims, and not by the specific embodiments described below.

Overview

Figure 1:
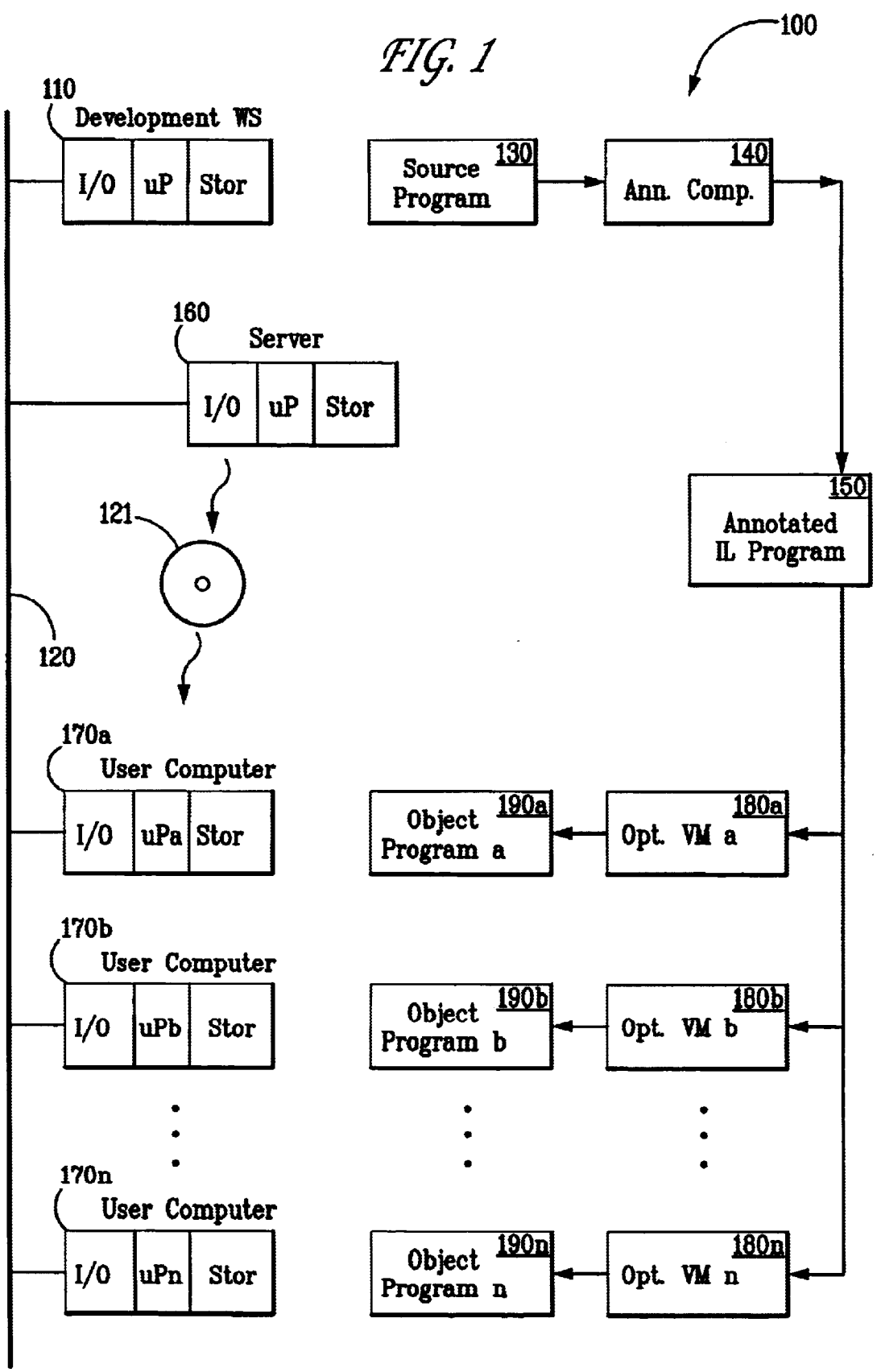
FIG. 1 is a high-level block diagram of hardware and software for practicing the invention.

FIG. 1 is a high-level block diagram 100 of hardware and software for achieving global optimization of a single machine-independent program in multiple processors having different architectures, using annotations and optimizing virtual machines according to the invention.

A program developer employs one or more conventional computers or workstations 110 having storage of various types, one or more processors, and input/output equipment for receiving and displaying data and for connecting to a network 120. The developer writes or receives a program 130 in the form of source code. An annotating compiler program 140 according to the invention parses source program 130 to an annotated intermediate language program 150. Intermediate language program 150 comprises an intermediate form or parse tree expressed in any of a number of existing or purpose-built intermediate languages and annotations. The intermediate language representation contains processor independent constructs/graph edges which identify possible optimizations that can be made to the intermediate language representation. Processor dependent annotations identify which of these optimizations are most suited for a particular processor architecture or class of architectures.

An annotated IL program 150 is distributed as a single version to multiple users a, b, . . . , n. Distribution may occur in any manner, such as via storage medium 121. Transmission via network 120, either directly or through a server 160, may also be employed.

User computers 170a, 170b, and 170c may include microprocessors uPa, uPb, and uPn of different types, having architectures that are not only mutually incompatible, but differ greatly. An optimizing virtual machine (VM) 180a receives annotated IL program 150 and translates it to an object program 190a using a native instruction set capable of executing on processor uPa. VM 180a produces optimized object code program 190a for that particular processor, selecting and using the annotations of IL program 150 that are aimed at that architecture. VM 180a is aware of the resources—number of registers, parallel execution units, etc.—of its microprocessor. Therefore it can determine, with knowledge of the IL program provided by the annotations, how to use the available resources efficiently.

The optimizing VM 180b of user computer 170b differs from VM 170a, because its microprocessor uPb has an architecture different—perhaps very different—from that of uPa. Optimizing VMs 170a and 170b employ exactly the same IL program but different annotations from program 150. Thus, they generate object programs 190a and 190b that are optimized in completely different ways. This is, of course, in addition to differences in object programs because of different instruction sets for the two processors.

User components 170n–190n may be the same as those for another user, or may comprise yet another different optimizing VM for a third microprocessor uPn. Some authors restrict the term "virtual machine" to an interpreter that converts one token, IL instruction, or other IL-program unit at a time into executable code. Herein, this term is given a general meaning as any program or other component that translates an IL program 150 into an object-code program in a user's system. In some applications of the invention, it is foreseen that the virtual machine will be a program residing in a user's machine, and will convert most or all of an IL program or module as a whole, rather than interpreting and executing one IL instruction at a time. The object program can be run immediately or can be saved for later execution. Subsequent invocations can retrieve the saved object program for execution, or can retranslate the IL program. An optimizing VM of the present invention can optimize over a range much greater than a single token, instruction, or similar small portion of IL-program 150, even though it might process only one or a few IL tokens at a time. That is, because the IL program identifies global optimization choices, the VM can quickly make global optimization decisions preferably relying on the annotations, or by examining the IL program directly, if no appropriate annotation exists. Moreover, it is possible to issue a new annotation for a given IL program thus eliminating the need for a VM to analyze the program directly. This would permit a user's virtual machine to optimize for a type of architectural feature that might not even have been known when the program was first written and compiled even though IL program 150 has already been compiled and distributed.

Because most of the time-consuming work is performed in producing the IL program and its annotations, virtual-machine programs can be made to operate quickly. In some usages of system 100, invocation of an application program by a user causes the optimizing VM to translate and optimize the IL program at that time, at least for the first invocation of a received program, and possibly for every invocation. Such just-in-time translators ("jitters") can be made fast enough that a user does not perceive a significant delay between translator invocation and object-program execution.

Embodiment Details

Figure 2:
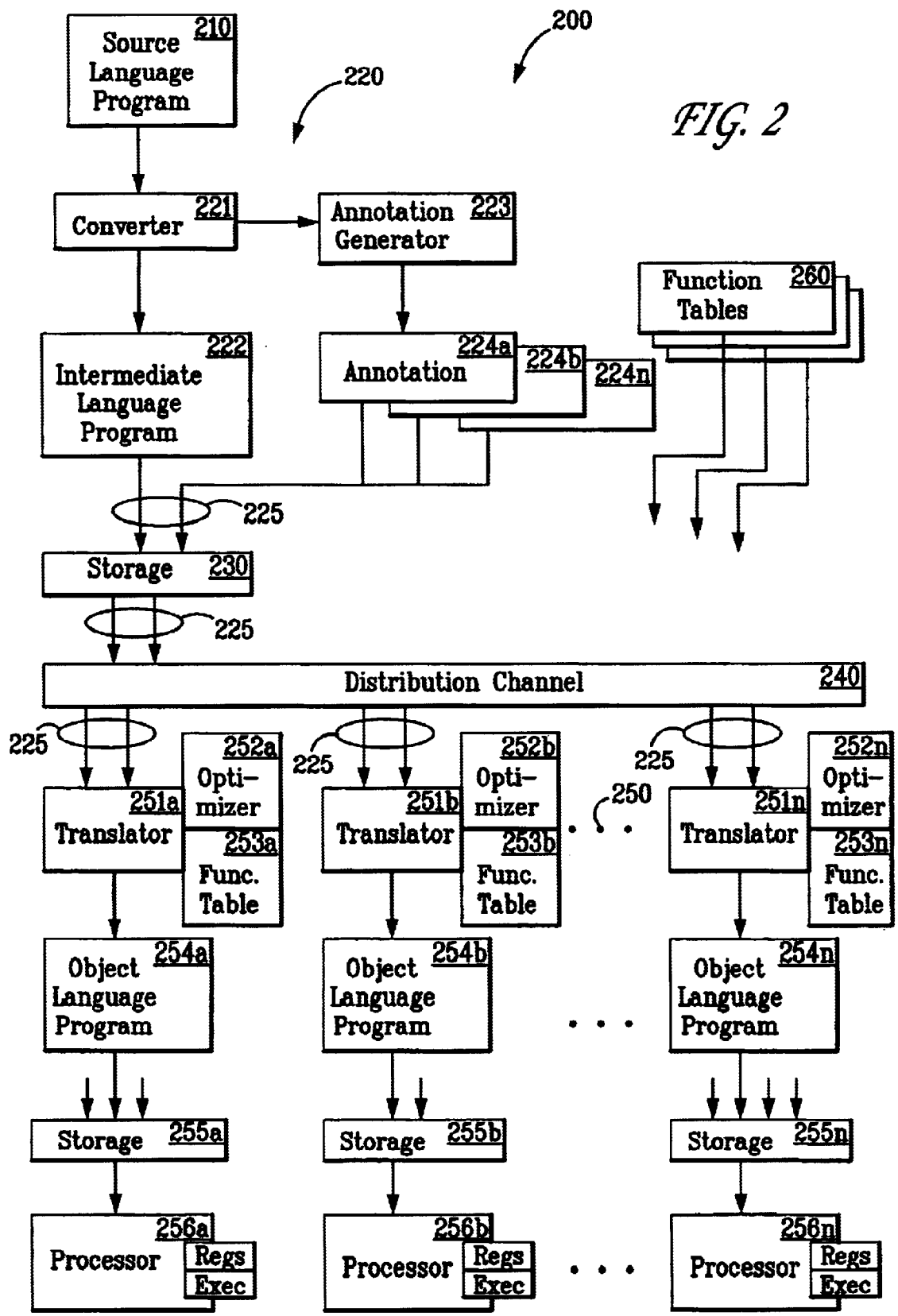
FIG. 2 is a more detailed block diagram showing an embodiment of the invention.

FIG. 2 is a more detailed block diagram 200 of an overall system. Program 210 is a file, group of files, or other entity containing source code in a high-level language such as C, C++, or Visual Basic. One of the characteristics of high-level languages is the use of constructs such as functions, classes, and flow controls that operate in the conceptual domain of goals to be achieved, rather than in the operational domain of the tools employed to achieve the goals, which deal in physical facilities such as registers, stacks, pipelines, and arithmetic/logic units.

The front end or analyzer of a typical two-stage compiler performs a lexical analysis of the source code, parses it, and converts it into compact tokens representing elements of the original program. While fulfilling these functions, modern compilers extract information about the structure and contents of the program that is employed by the virtual machine or translator for optimizing the object code that it constructs by translating the parsed and tokenized intermediate form of the program. The invention performs the functions of a compiler having two stages or phases, but does so under a unique overall system model or paradigm.

In this embodiment, annotating compiler or analyzer 220 includes a conventional converter 221 for converting source-language program 210, typically by parsing and tokenizing it, into a program 222 expressed in an intermediate language (IL). Any one of a number of existing or purpose-built intermediate languages can be employed. The actual code in most intermediate languages takes the form of a representation of a parse tree whose nodes define variables or perform operations, or both. An operation might use one or more of the variables or constants, referring to them by coded names. Sometimes intermediate languages are referred to as tokenized code, in that variables and operations can be represented by coded tokens recognized by a companion back-end unit of a compiler. The operations are typically at a lower level than those of SL program 210, and individual variables can carry ancillary information designating a particular format, e.g., short integer or floating-point. In the present invention, intermediate language (IL) program 222 also includes constructs (processor independent annotations) that identify possible optimizations that can be made as intermediate language program 222 is converted from intermediate language into object code that can be directly executed on a microprocessor. As explained below a modified form of Single Static Assignment (SSA) is used in one embodiment to identify the possible optimizations. Including the possible optimizations in IL program 222 provides a processor independent representation of optimizations that can be made. In addition, because the entire source code language program is available, converter 221 can identify not only optimizations local to various portions of the program, but also global optimizations as well. In an ideal case, IL program 222 identifies all possible optimizations that could be made to the program, however, for various reasons, different embodiments may choose to identify less than all possible optimizations.

Annotation generator 223 creates processor specific annotations that identify which optimizations of IL program 222 are particularly suited for a particular processor or processor architecture. In FIG. 2 these annotations are indicated by annotation 224a, annotation 224b, and annotation 224n. In one embodiment of the invention, an annotation contains at least one ID, link or other mechanism to identify which annotation(s) in IL program 222 are best suited for a particular processor or processor architecture. In other embodiments, more or different information may be included, such as a listing of the optimizations identified in IL program 222 along with their characteristics or other information that would allow a VM or other entity to identify which optimizations should be selected given specific knowledge of the characteristics and architecture of a particular processor.

Figure 5:
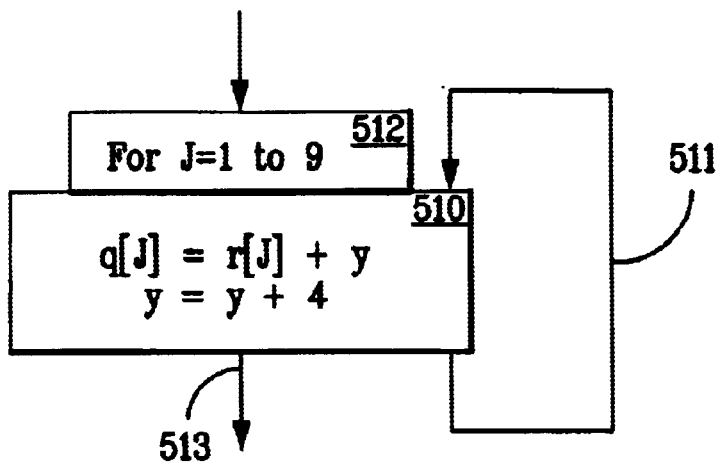
FIG. 5 is another portion of a graph for the source-code listing of FIG. 3.

All of these annotations are packaged together for communication to another computer system. This packaged output of generator 223 is a data structure or file 224. FIG. 5 shows an illustrative data structure for an annotation which will be described further below. Many different forms of annotation are possible, and other types of attributes of the IL program can be encoded.

Annotation generator 223 generally needs knowledge of the architecture of the targeted processors. Furthermore, identifying the appropriate set of optimizations that are best suited to a particular processor may be a relatively time consuming process. However, as indicated below, once the optimizations have been identified and the annotated IL program representation completed, it is an extremely rapid process for the optimizations to be applied when the IL program is converted to object code for execution on a particular processor. Furthermore, if additional processor architectures become the subject of interest after an annotated IL program has been created, additional annotations that identify the optimizations for the additional processors may be issued without recompiling the program.

Additional sets of components 220 can be developed for additional source languages, such that programs of different source languages can all be compiled down to a common IL program representation. Although the converter will differ for different source languages, it is possible that large parts of annotation generator 223 can be reused.

IL program 222 and annotations 224 may be grouped into a single distribution package 225 called an annotated IL program. Package 225 can be stored on a medium 230 for shipment to a number of different users over a distribution channel 240. On-the-fly distribution without storage is also feasible. The package 225 can take the form of a physical box containing a storage medium 230 such as an optical or magnetic disk, printed manuals, and so forth, for distribution via conventional channels 240 such as stores or mail-order houses. Electronic distribution is becoming increasingly popular. Therefore, the storage units of a server 160, FIG. 1, could hold the package and on-line documentation for downloading over distribution channels 240 such as network 120 or storage medium 121, FIG. 1. Other channels for distributing the package can be appropriate as well.

A number of user systems 250 receive copies of package 225 from distribution channel 240. The individual systems 250a, 250b, . . . , 250n all receive the same package, although possibly at different times, from different sources, and over different channels. Any or all of the systems might run on different processor platforms. For example, processor 256a of system 250a might have a small number of registers and only a single execution unit, while processor 256b has a RISC architecture with many general-purpose registers, and processor 256c is a VLIW (very long instruction word) machine having multiple parallel execution units. Other architectural features significant to program optimization, such as stacks and pipelines, may differ as well.

A virtual machine in each user system includes a code translator component 251 that receives the IL program 222 of package 225 and converts it through JIT compiling, interpreting, or otherwise translating it to object language (OL) program 254a–n in the form of individual instructions in the object code or language of processor 256a–n. This form of the program can be kept in a storage 255a–n until a user requests its execution by processor 256a–n, or it could be executed immediately if desired. Storage 255a–n might take the form of memory, disk drives, or any other storage. That is, OL program 254a–n can be treated in exactly the same manner as other programs, indicated by the short arrows into storage units 255a–n, whether or not those programs were generated according to the invention or in any other manner. At the OL level, programs 254a–n are exactly like any other object-code programs that run on the users' systems 250.

Each individual translator 251a–n, of course, is designed specifically for its respective processor 256a–n. Although each performs the same overall functions, each generates object code for the particular instruction set of its processor, and may perform other operations differently as well. In addition, optimizers 252a–n are designed separately for each different processor architecture. As described below, each optimizer receives the annotations 224 of package 225 and selects the appropriate one for the architecture of its processor, by name matching or other means. Optimizer 252a–n then employs the selected annotation to optimize the conversion of IL program 222 in translator 251a–n for its particular processor 256a–n. That is, optimizers 252a–n all employ the same IL program 222, but they can use the annotations to translate it in mutually different ways to accomplish different results. For example, annotated IL program 225 can be implemented as an object in the publicly available COM+ (component object model) standard. Translators 251a–n are then COM+ runtime modules incorporating global optimization routines. Other implementations might employ different programming standards or technologies.

Function tables 253a–n permit upgrading and versioning of translators 251a–n, and will be described in connection with FIG. 7. Basically, making the translators tabledriven allows parts of the individual translators 251a–n to be designed in common. It also allows upgrading a translator to, say, a new processor version having a similar architecture merely by distributing new function tables, indicated at 260. FIGS. 3 and 4 are examples illustrating the identification of possible optimizations in the IL program. The constructs or processor independent annotations used in the graph allow mapping from a unique definition site of an entity in the IL program to a register, a symbol, or a call-back function in the run time translation process. According to the invention, the program developer's compiler analyzer 220 records (annotates) possible optimizations in a manner that is not tied to any specific processor architecture. This permits designing efficient machine-dependent optimizing translators 251a–n, 252a–n and 253a–n that are essentially linear with respect to the size of their IL-program inputs.

Converter 221 translates the short section of source code indicated generally at 300 in FIG. 3 into a parse tree having interior nodes corresponding to operations such as additions at line 301, and exterior or leaf nodes corresponding to variables such as the variables 'a', 'b', and 'c' of that line. This parse tree is independent of any particular processor architecture. It can be translated into the form of an intermediate-language program 222 that records the lexical structure of the source program without incorporating any dependencies upon a particular processor that might execute it. (Some conventional intermediate languages are deliberately designed to favor one or another processor as an execution platform, but this IL is preferably neutral in that regard.) The IL program is typically embodied as a table or other data structure that encodes the operations and variable A code portion in column 310 has opportunities for optimizing the execution of an IL program derived from it. Code portion 310 comprises lines of code indicated at 301, 302, 303, 304, 306, 307 and 308. The subexpression 'a+b' in line 301 reappears in line 308. If, as indicated in column 320, a processor could assign this subexpression to a register, say 'R7', in which it could reside until its further use, then the processor need not evaluate it again. Column 330 shows how a variable 'p' could be computed as the sum of 'R7' and 'c', while line 308 avoids recalculating this common subexpression by reusing the contents of 'R7'. Registers can also be used for operands and variables in further embodiments in addition to subexpressions to improve performance in processors which have many registers available. Use of registers in this manner alleviates the need to obtain operand values from much slower memory.

The subexpressions in lines 301 and 308 are common only if code 310 does not explicitly assign a different value to the variables 'a' or 'b' between the time the subexpression is defined and its later use. A concept known as Single Static Assignment (SSA) employs use-definition edges to track certain variables from their definitions through all uses in which they have not changed, thus ensuring static values over the range of their edges. Use-def edges can be thought of as back pointers, which point to a previous definition of a variable or other entity. However, conventional use-def edges can track only unaliased scalar variables which are single values that cannot be changed except by explicit reassignment. In code portion 310, operations involving a pointer 'r' or 'q' at 304, 305 and 307 might indirectly affect the value of 'a' or 'b'. Execution of a subroutine 'foo' at 306 might modify 'a' or 'b' internally.

Standard SSA use-def edges follow the variables of the IL, the exterior nodes of the parse tree. In one embodiment of the present invention, standard SSA has been modified to allow possible optimizations to be represented in a processor independent fashion. The use-def edges employed herein instead follow operators, functions, pointers, or any arbitrarily complex expression, which are typically the interior nodes of the parse tree. Edge 311, for example, tracks the definition of a subexpression on addition operator in line 301 between operands a and b, to a later use of that operator in line 308 in the same subexpression. The subexpression can include any type of variable, including one that could possibly get slammed (sent to slower memory or otherwise affected) by a pointer. Thus, edge 311 also assumes the absence of implicit reassignment. This can be achieved by tracing pointer operations, as in lines 304, 305, and 307, throughout program 310 in order to insure that they cannot affect the values of 'a' and 'b'. In addition, the execution path of subroutine 'foo', called at line 306, is traced to determine whether it could possibly affect the values of these variables between definition and use. Edges that exclude the possibility of implicit reassignment are more time-consuming to establish than those that only exclude explicit reassignment. They require much more thorough tracing of the possible execution paths of the IL program. This shortcoming, however, is more than overcome by their utility in the present context, as detailed below.

Control flows straight through program portion or fragment 310, without any branching. Alternative execution paths, found in almost every real program, are handled by Phi functions in standard SSA. When alternative paths both involve the same variable, their convergence into a single path designates a special kind of assignment function 'R7= Phi{R7, R7}' of that variable. If 'R7' is defined so that is has the same value from all the alternative paths, then that definition dominates it. The present system employs Phi nodes that are defined on operations or arbitrarily complex expressions, rather than upon variables.

FIG. 4 shows a fragment of a control graph 400 in which a common subexpression 'a+b' is defined in the same way in the alternative paths 410, 411 and 420, 421 leading to block 430. Block 430 thus creates a Phi node having an output subexpression on 431 that is guaranteed to have a single dominating definition. Finding Phi nodes in an IL program involves investigating the entire program graph in compiler 220. However, the identification of Phi nodes in the IL avoids a later lengthy search to determine which of several definitions might cover a common subexpression.

Variable assignment can also be optimized for some target processors by searching for the existence of induction variables in IL program 222. An induction variable is an index whose value is assured at the end of a loop. Some newer microprocessors have rotating register regions that can unroll a loop to avoid repeated loads and stores of the same value. If a Phi node occurs in the header of a sequence of basic blocks whose edges form a cycle, then its variable is an induction variable. Renaming the uses of the induction variable allows the scheduler of this type of processor to optimize the loads of the variable. In FIG. 5, for example, block 510 has an edge 511 forming a cycle. Its header 512 contains a variable J that serves as a loop index within the cycle. Although the value of J changes during the loop while path 511 is taken, it must have the value J=9 when path 513 occurs at the end of the loop. Therefore, giving the Js used within the loop of block 510 a definition different from that outside the loop might allow multiple iterations involving J, J+1, J+2, . . . to be executed in parallel on processors supporting such parallelism without requiring separate definitions of J for every value it assumes during the loop.

FIG. 6 shows the overall method 600 of operation of the system described above. A programmer initially prepares source-language program 210, FIG. 2, using a conventional editor and other development tools. Source program 210 can be produced in exactly the same manner, and with the same tools, as a program that is to be compiled and executed in any other manner. Block 610 receives the prepared source program.

Block 620 converts source program 210 by lexical analysis or parsing the source code. The result is an intermediate-language program 222. The next set of blocks 630 generate annotations. They may be implemented as part of block 620, but are also useful in receiving a program that has already been converted into IL. Block 631 finds the use-def edges for all operator nodes in the IL program, determines the Phi nodes, and gathers other information that might be useful in optimizing performance, such as opportunities for parallel execution of instructions and loop optimizations. This information is still agnostic as to any particular processor architecture. The IL program has possible optimizations identified therein in a processor independent fashion. One embodiment uses the modified SSA techniques discussed above for identifying possible optimizations. In the interest of reducing the total number of converters 221 and translators 251 that need to be developed for system 200, it is desirable to use the same intermediate language—or at least a small number of such languages—for all of the different source languages that might be employed. Such standardized intermediate languages are now commonly used in conventional two-phase compilers, and the same ones can be used with the present invention if desired. As a further refinement, any of a number of known compression algorithms can be applied to the IL program, rendering it often smaller and faster than the original native code. Huffman coding is a simple and effective technique for this purpose.

Blocks 632a–n build a set of annotations that identify which of the possible optimizations in the IL program should be used for a particular processor. Block 632a builds one annotation for a processor whose architecture is represented by data 633a. If this processor has a limited number of registers, then block 632a finds those edges having less than a certain distance between definition and uses, and records only those as candidates for assignment to registers. Block 632a also lists the locations of the φ nodes, so that the maximum span to a definition point is known. Block 632b builds a separate annotation for another architecture, represented by data 633b. These processors might have more registers, so that more edges—i.e., more common subexpressions—can be evaluated once and then assigned to registers. This processor might also include multiple execution units, allowing block 632b to identify expressions that have no mutual dependencies, and thus can be executed simultaneously. Other blocks, such as 632n and 633n, generate and represent annotations for other architectures in the same manner. Annotation information is the same type of information, sometimes called 'hints' in the art, that a conventional two-phase compiler generates for the internal use of its own back end on the development system. The major difference is that the information is generated for multiple different architectures, then packaged and sent to multiple systems outside the development system for use during subsequent translation to object code tailored to each different systems. The annotations can exist as a separate file, as an integrated part of intermediate program 222, or as any other type of structure or entity that can be communicated and distributed outside the compiler in a format known to the multiple translators.

Block 640 represents the distribution of both the intermediate program 222 and the processor dependent annotations 224. Although it is foreseen that these two items will most often be distributed together as a single package, occasions may arise where they might be sent and/or licensed separately. Distribution can be by normal retail channels, where a single package includes a CD-ROM or similar storage medium containing both the intermediate program and the annotation file(s). The invention also makes it practical to distribute programs to users by downloading over a network such as the internet or a corporate LAN, because the intermediate program has a compact form, and the annotations are generally relatively small. Arrows 641 symbolize the distribution of the single IL program and its set of annotations to multiple remote users having a mix of systems with processors of differing architectures.

Blocks 650–680 are replicated on each user system, but tailored to the architecture of each system. Within each user system, block 650 receives the IL program and its annotations, and can also store them, either temporarily or as an archive copy.

Blocks 660 translate intermediate program 222 to an optimized object-language program 254. Block 661 selects one of the annotations, say 224a, that is appropriate for the processor in that particular system, based upon its name or other key. Block 662 translates the single architecture-agnostic IL program into object code in the instruction set of the user's processor. Block 663 employs internal knowledge of the specific processor for which it was designed to optimize the object-code program 254 during the translation process, by employing the annotation produced for that processor's architecture. That is, IL program 222 does not itself optimize the object code, because it has no internal knowledge of processor architectures. Instead, the selected processor specific annotation 224a identifies which of the possible optimizations in the IL program are most suited for the particular local processor. Because the processor specific annotations identify which optimizations are suited for the particular processor of the user machine, the VM cracks the edges of the IL program rapidly, so as to allow the particular virtual machine in the system to optimize the object program in a global manner very quickly.

Alternatively, if no processor specific annotations exist that identify which optimizations in the IL program are particularly suited to the processor of the user machine, the VM is designed in one embodiment to analyze the possible optimizations and select those appropriate for its processor, or even to ignore all annotations. To help this process, it may be desirable to store certain information in the processor specific annotations that identifies the location and/or characteristics of possible optimizations to eliminate the need for the VM perform any detailed examination of the IL code to identify which optimizations should be selected.

Optional block 670 stores the object-language program. Note that the VM can translate the IL program into object code and store it for later execution, the VM can JIT (just in time) compile or translate the IL program and load it for immediate execution, or the VM can interpret the IL program, or otherwise translate and prepare the IL program for execution. Depending on which type of VM is used, storage block 670 may represent storing the program in persistent storage (such as a hard disk) or storing it in memory, or not storing it at all and simply providing object code for direct execution. Blocks 680 represent running of the program. Block 681 receives a user call or invocation, and block 682 executes the object-code program.

The time order of these steps may vary. In many settings, the speed of a virtual machine permits blocks 660 to occur upon the user's invocation of the application, as mentioned earlier. For most programs, even relatively large ones, the entire translation/optimization time requires only a few seconds. (This compares with a much longer period to perform blocks 620–630 for the same program.) It is thus feasible to retranslate and re-optimize the IL program upon every invocation, if desired. Alternatively, block 670 can store the entire optimized object-code program for immediate execution upon subsequent calls. As another alternative, translation and optimization can be performed at a time unrelated to execution, such as when it is first received or when the user moves it to a different system. In any case, the operation of blocks 660 can be made substantially transparent to a user.

Figure 7:
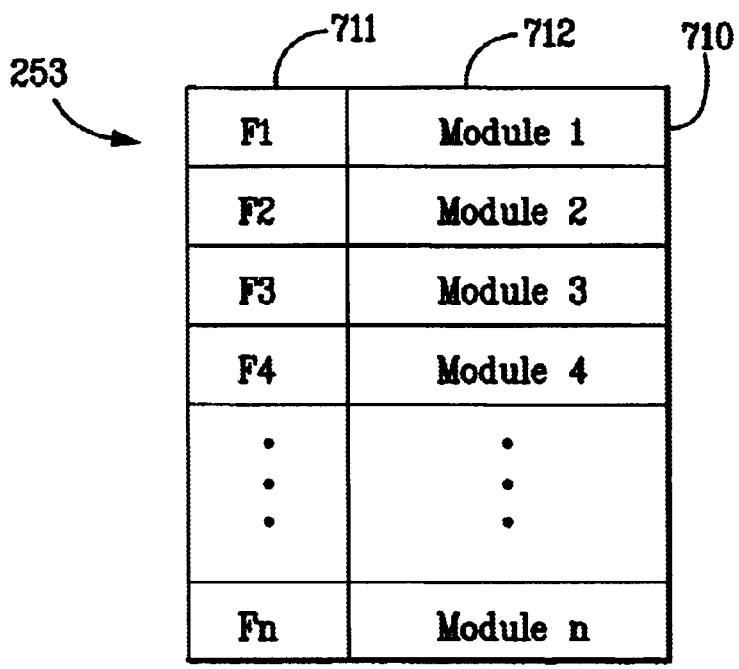
FIG. 7 is a representation of a replaceable function table for the system of FIG. 2.

FIG. 7 shows the structure of a function table 253*a–n* for driving any of the translators 251*a–n*. Table-driven programs in general are recognized as being highly flexible and configurable, and are known to be easy to construct and maintain. The use of a table to direct the operation of translator 251*a–n* has several major advantages. Because functions in the table are replaceable, the translator can be easily upgraded to serve another processor or to improve its operation for the current processor. Third parties can in effect sell improved translators simply by supplying a new table, or replacement functions.

A translator is amenable to construction in table-driven form, because its overall function is to look up coded objects and to replace them with other objects. An overall state machine or automaton merely cycles through the points at which objects require translation, performing functions and transferring to a next state as determined by entries in the table. The overall operation of translator 251*a–n* can be expressed symbolically as a loop of actions:

X=(*(COM[(Attributes[ssa_def])])) (Current_IL_Ptr, Attributes[ssa de_def])

The return value X is the result of invoking an indirect function call on IL program 222, here represented in the form of a data array named COM. Current_IL_Ptr symbolizes a loop index into the program array that being expanded for the current architecture, and takes on successive values representing all the nodes of the parse tree of IL program 222. The unique definition number ssa_def specifies an index into a table of pointers to functions each having two parameters. Each function defines a translation operation. Each translator 251*a–n* has its own function table 253*a–n* in FIG. 2. The tables for different processors are different, and they can be separately loaded into translators 251*a–n*, making them easy to replace for upgrades or revisions.

In the most straightforward implementation, the translator can simply substitute a machine dependent operand, such as a register, into the IL program. More sophisticated embodiments call a function in a table 253*a–n* to perform strength reduction, induction variable substitution, scheduling, loop unrolling, etc. In either case, compiler analyzer 220 can optionally use this technique only on performance-critical portions of the program in order to save space in the one executable program that is distributed.

Table 253*a–n* for driving a translator 251*a–n* comprises a number of entries 710. Each entry names a function in a field 711, and refers in field 712 to one or more function modules that the translator invokes to carry out that function. One or more of the functions in field 712 can name another function in the same table. The names of the operations in field 711, etc. are merely integers that correspond to integer tags in the intermediate-program nodes.

Figure 8:
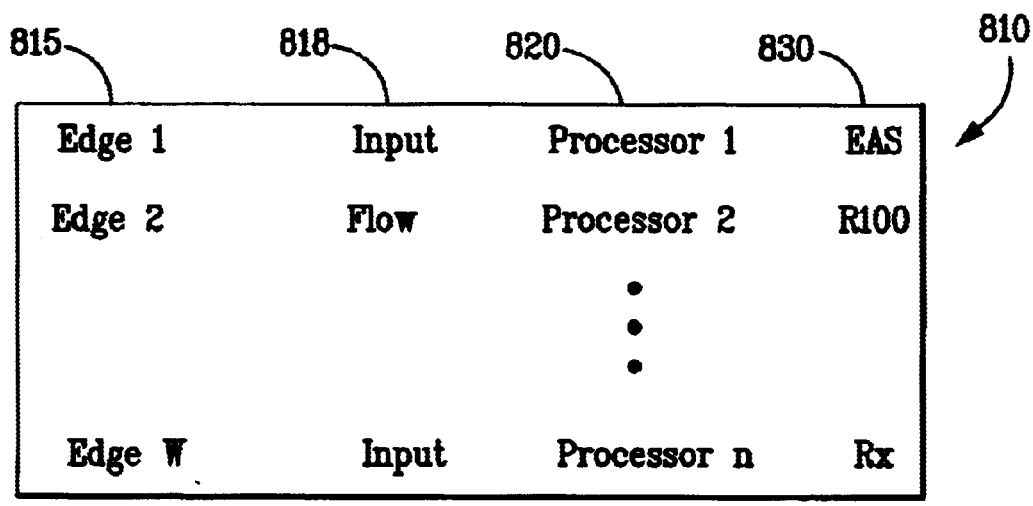
FIG. 8 is a simplified representation of processor specific annotations for an edge of a graph.
Figure 9:
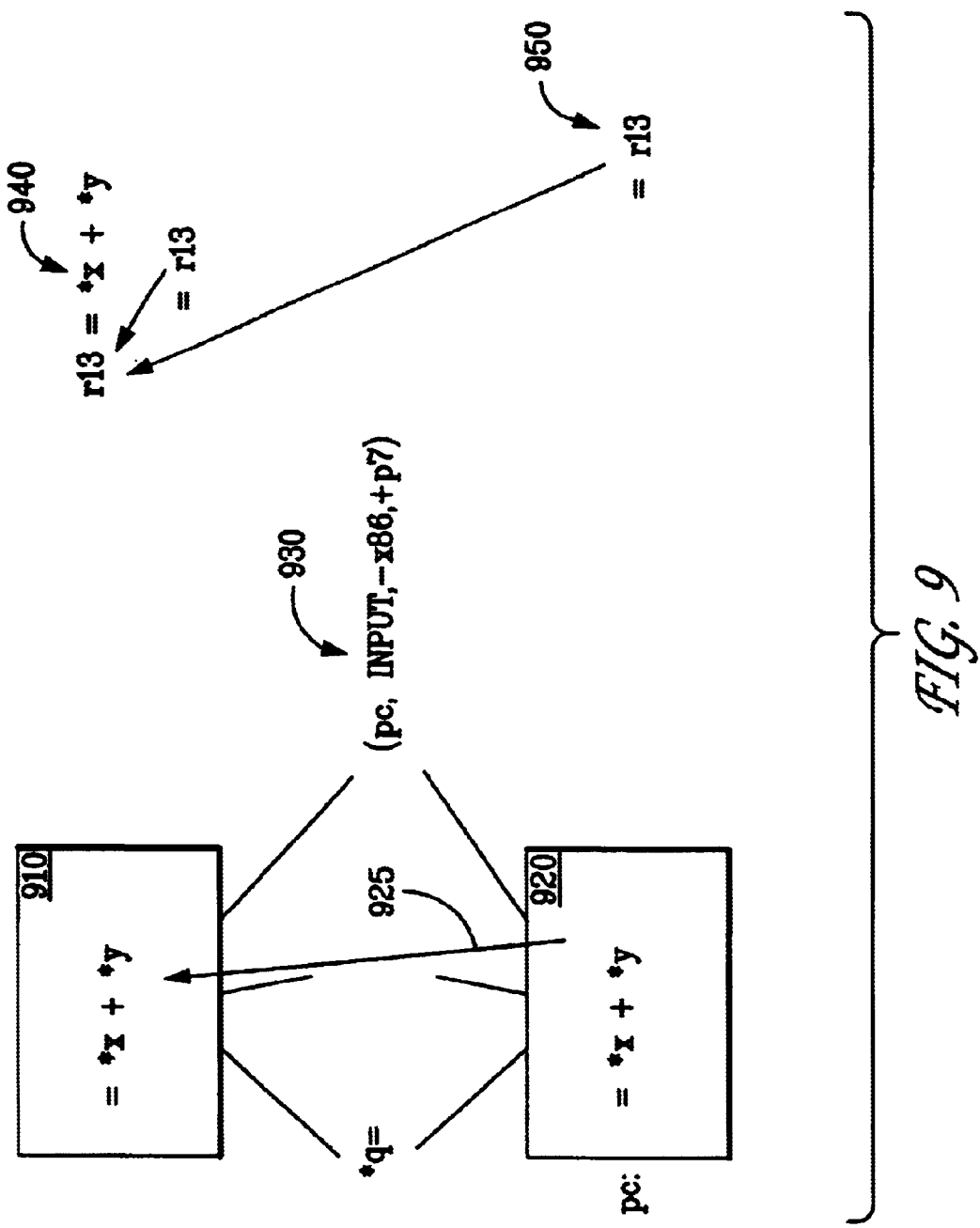
FIG. 9 is a block representation of global variable related edges.

A simplified example of processor specific annotations is shown in FIG. 8 generally at 810 in table form. This is just one type of annotation. Different types are shown for an alternative embodiment below. The annotations function to identify or label which optimizations make sense for identified processors. As indicated above, optimizations are annotated in graph edges. Each of the graph edges are numbered 1 through w as indicated in a first column of edges 815. Each edge may identify optimizations which are applicable in different ways to different processors. A second column 818 may specify an edge type, such as INPUT or FLOW. The processor is identified in the third column 820. A third column 830 then identifies what to do with the optimization, such as which register to use. Each row of table 810 functions as a label for an edge. The simple example of register assignment is shown. For example, edge 1 is applicable to both processor 1 and processor 2. However, the recommendation for each is different. Edge 1 in processor 1 identifies that the subject of the edge, i.e., a variable in one example should be stored in register EAS. In processor 2, the variable should be stored in register R100. Not shown, is that perhaps processor 3 has a very limited number of registers, and the optimization identified by the edge should not be used. Processor 3 may appear in the table with such an indication, or if processor 3 is not in the table for edge 1, then edge 1 is ignored.

Simple examples of different uses for edges are shown in FIGS. 9, 10, 11 and 12. A definition which is the sum of two entities *x and *y is indicated at 910. Several intermediate lines of code may then occur, leading to a second use of the definition at 920. This results in the generation of an edge, 925, between lines 920 and 910, provided that the definition can not change during execution of all possible paths between such lines. Also note that alias information along all paths is captured. Line 920 is also identified by a program counter, pc. An example of one possible processor specific annotation for the edge 925 is shown at 930. For this example, the annotation takes the form of a program counter, pc, and input dependence, INPUT, and two processor annotations, −x86 and +p7. −x86 is used to indicate that no optimization based on edge 930 is to be performed for an x86 type processor. The compiler may reach this decision based on a number of factors, including the limitation of the number of registers available in an x86 architecture machine, namely eight. The next processor identification +p7 refers to positive of use of an optimization identified by this edge by an Itainium or Merced processor having many more registers, such as 128 registers. Other processor types may be added to annotation 930. Additionally, other encoding may be used for annotation 930 as long as a translator or JIT compiler on a target machine can identify which optimizations should be made for the target machine. A representation of this optimization appears at 940 and 950, wherein a register r13 is used to store the definition, *x+*y. The same register is used at the other end of the edge as indicated at 950, thus avoiding recalculation of the definition.

Figure 10:
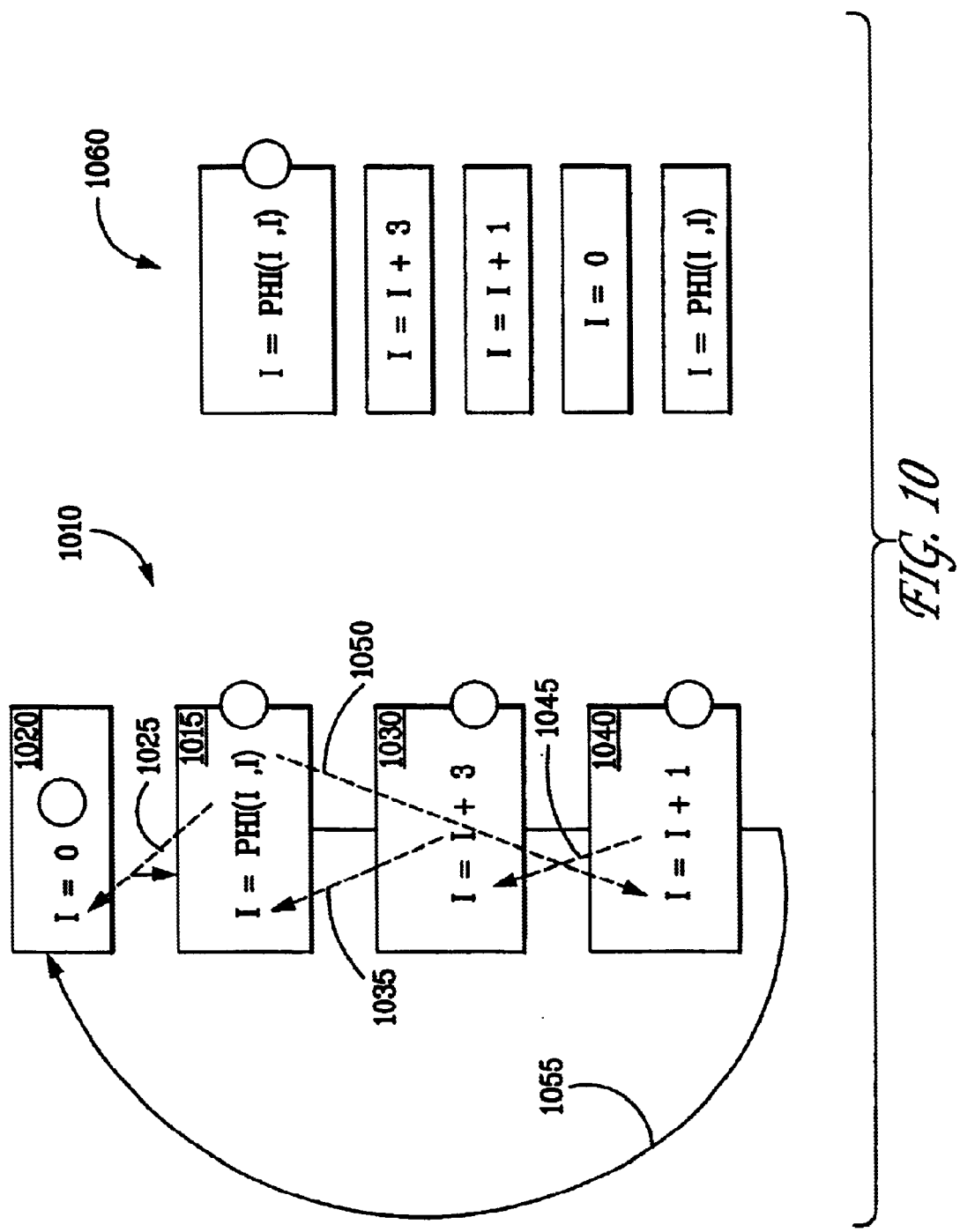
FIG. 10 is a block representation of the use of edges to identify loop optimizations.

FIG. 10 demonstrates the use of edges to identify cycles in a code sequence indicated generally at 1010. Using edges between uses and reaching definitions in an SSA based graph, to identify cycles in a code sequence, extends the utility of the invention beyond the elimination of global redundancy to loop optimization. The global redundancy elimination example uses one dimensional aspects of the graph (i.e., single edges) while cycles of edges use 2 dimensions of the graph to indicate loop optimization. A phi node is first identified at 1015 in the code sequence, where "I" may take one of two different definitions depending on the path taken through the code. The phi node is labeled as a linear induction variable. In the first path, line 1020 may be executed, defining I as 0. An edge 1025 is defined for such path. At line 1030, I may be set to I+3. Since this definition is valid between 1030 and 1015, an edge 1035 is created between them. Next, line 1040 may further modify I. An edge 1045 is created to indicate the relationship between these two lines. Finally, an edge 1050 is created to complete a loop and represent a program path indication 1055, wherein program flow returns to line 1015 with I having the value defined in line 1040. The edges represent multiple cycles in the loop. The cycles are labeled and may be used to "crack" (i.e., use the edges to translate optimally) the involved edges in a machine dependent fashion for strength reduction which creates more induction variables that use addition. A stack of instructions 1060 is created as the edges in an SSA based use-def graph are traversed. For example, beginning at line 1015, the definition is pushed onto the stack and the line marked. Edge 1025 is then traversed to line 1020 and line 1020 is pushed onto the stack, and the line marked. Edge 1050 is next traversed and line 1040 is pushed onto the stack and marked. The process continues with edge 1045 being traversed and line 1030 being marked and pushed onto the stack. Once edge 1035 is traversed and line 1015 identified, the cycle has been completely identified. A processor unique annotation may be used to identify the cycle. For example, an annotation may take the form of"pc, Linear_Cycle, x86,p7", which identifies the cycle, and that processors x86 and p7 should make use of the potential loop optimizations.

Figure 11:
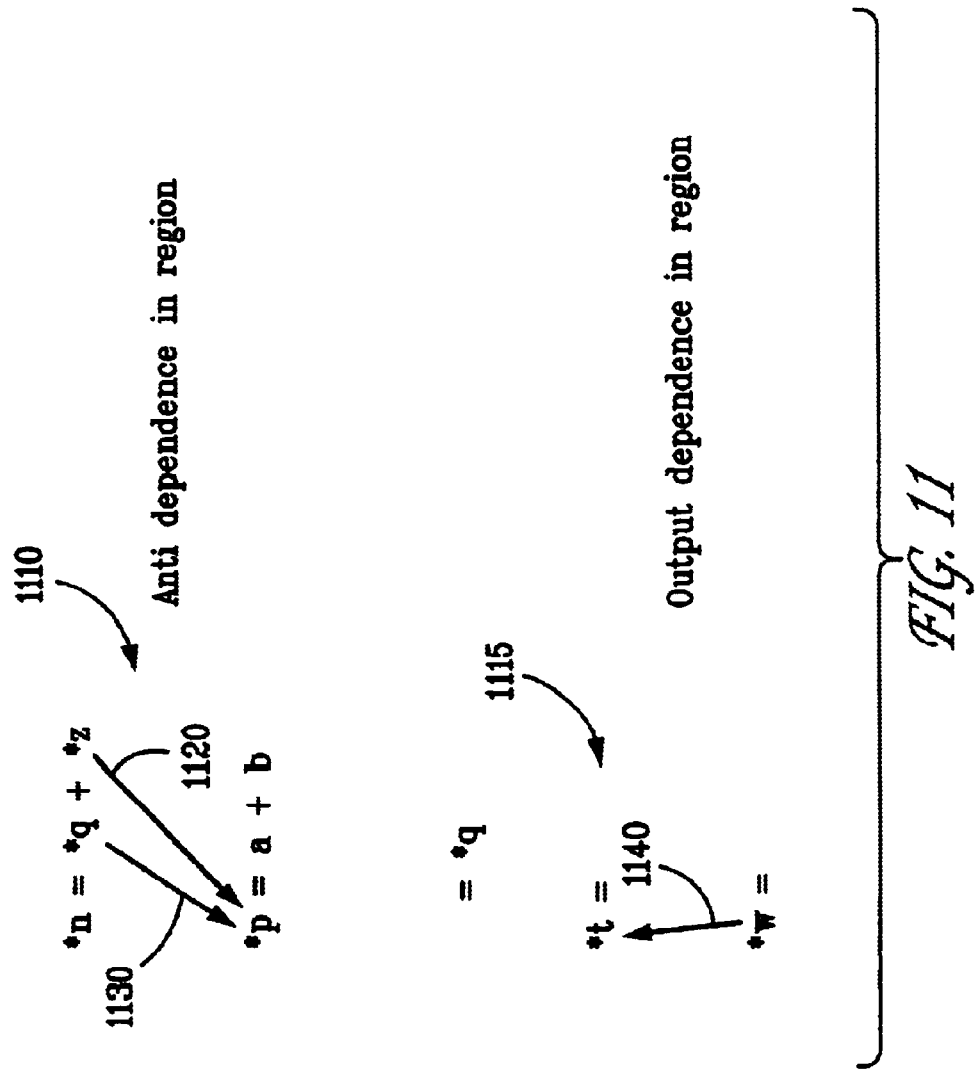
FIG. 11 is a representation of edges used to represent scheduling optimizations.

FIG. 11 shows the use of the uniquely extended SSA edges to identify an anti dependence in a region 1110, and an output dependence in a region 1115. Anti dependence in a region is represented by edges 1120 and 1130, which indicate that both *q and *z must be read before *p is stored. This type of information is most useful in global code scheduling to ensure what execution can be safely done in parallel. Annotations may take the form of "pc,ANTI, +x86, +p7". Output dependence at 1115 is demonstrated by an edge 1140 between *w and *t. The edge represents that prior to execution of a write (*w), another write (*t) must occur. This type of constraining edge is also useful in scheduling. It helps identify which actions must occur prior to scheduling another action, also ensuring what execution can be safely done in parallel. Annotations may include an "OUTPUT" qualifier to identify this type of edge.

Figure 12:
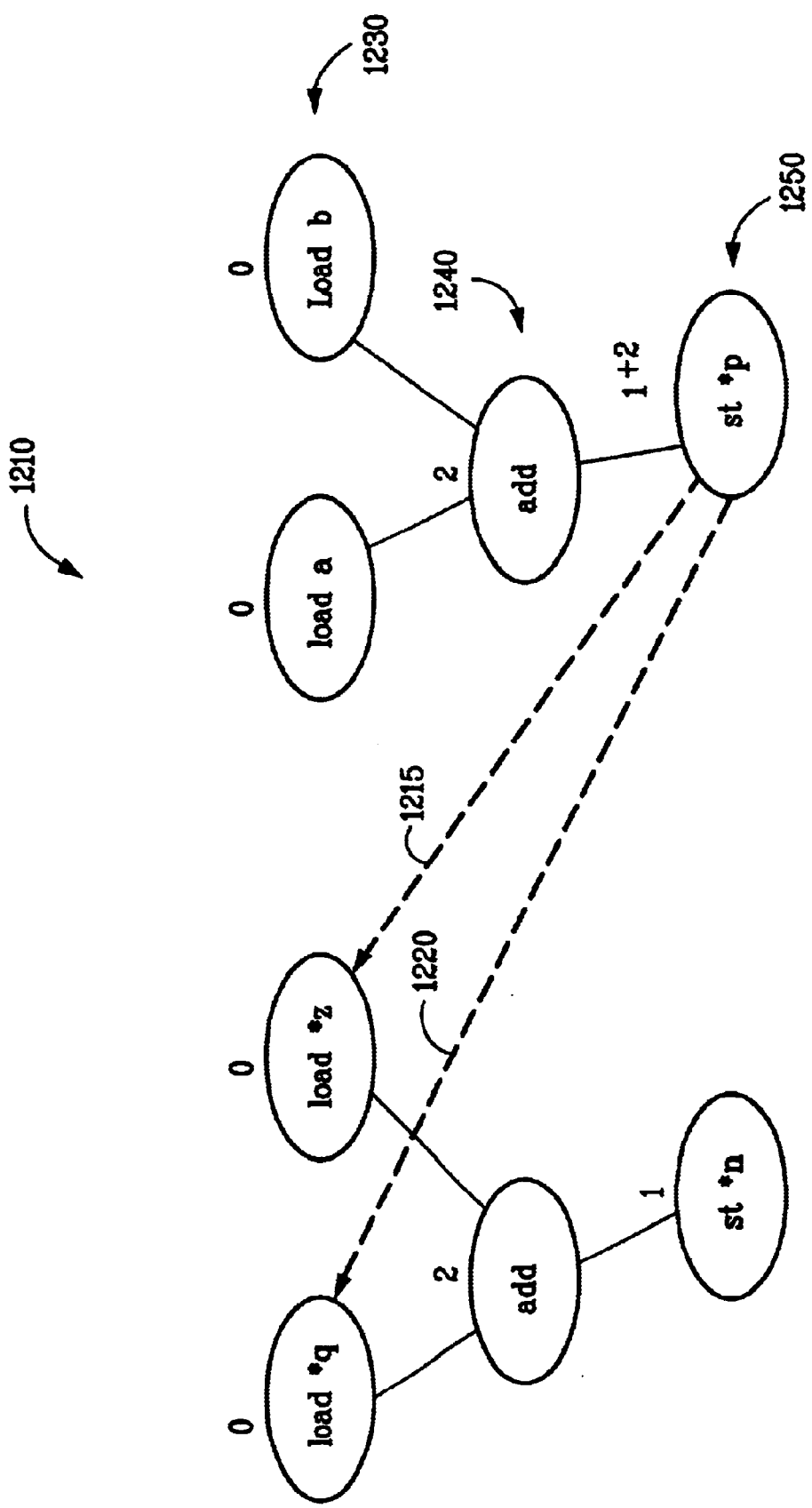
FIG. 12 is a representation of edges used to represent constraints for scheduling.

FIG. 12 shows actual instruction scheduling generally at 1210 in light of two constraint edges 1215 and 1220, which may represent anti dependence such as that shown by 1130 and 1120 of region 1110 of FIG. 11. Two load, add and store sequences are indicated in FIG. 12, with individual instructions shown within the nodes of FIG. 11. Load instructions are first performed generally at 1230, and add operations are then performed at 1240 with store operations performed at a last level. The numbers by each node indicate the number of machine operations that must occur before that particular instruction can be scheduled. Thus, at the snapshot indicated in FIG. 12, all the load instructions can be scheduled. While the add instructions can only be scheduled in the next cycle. Constraint edges 1215 and 1220 indicate that a store to pointer *p must first occur prior to loading of *q and *z. This constraint is indicated in the figure by adding two(+2), to the unscheduled predecessor count where the natural operands indicate a count of 1 unscheduled predecessor. This will guarantee that the proper scheduling is maintained since the count to the st *p instruction will never reach 0 until both the load *q and the load *z instruction are scheduled Assuming two execution units, an example of scheduling using the diagram of FIG. 12 might proceed as follows. Since the scheduler sees that all load instructions are ready for scheduling, it may schedule the load a and load b instructions for one execution unit. During the next cycle, the scheduler may schedule the load *q and load *z instructions on the other execution unit. As the load *q instruction is scheduled, the count between the add and st *p instruction is decremented once. As the load *z instruction is scheduled, the count between the add and st *p is decremented again, thus leaving the normal 1 cycle between the add and st *p instruction. This frees the st *p instruction to be scheduled anytime the normal one cycle delay has been satisfied. These implicit constraints are most useful in optimizing parallelism because they identify a proper sequence of events. A label for constraint type edges such as these can take the form of "pc, ANTI, +x86, +p7" or "pc, OUTPUT, +x86, +p7".

Conclusion

The foregoing description sets forth systems and methods for providing one universally distributed executable for many different architectures, which can run with peak performance regardless of the final hardware target. A source-language version of a program is converted to an abstract instruction set with a unique, embedded graph structure in a radically extended SSA form. The edges in this graph are labeled for the actions of each machine specific translator. This allows for an extremely rapid instantiation of a global optimization, for specific hardware architectures. Additionally, the translators that ride on the myriad targets are engineered such that if the edges in SSA form are not labeled for that specific target, then the translator can algorithmically use the edges to perform traditional global optimization; in effect, deriving the missing edge label information.

At least three classic optimizations are addressed by the present invention. Global redundancy elimination, loop optimization and scheduling machine instructions to exploit parallelism can be done using the edges and annotations described herein. It should be noted that while SSA type edges have been described, other methods of back pointing that have similar properties may also be used. Further, such edges may be incorporated in different ways into an IL or other program which can be interpreted or compiled to many different back end machines. In one embodiment, the edges are annotations which are independent of the type of end machine. Such annotations can be either embedded directly in-line in the executable, or exist as separate information with appropriate information to identify how they apply to the executable. Processor specific annotations are described as residing in a separate table, but may also be embedded in the executable, either directly associated with the edges, or at any other desired place in the application. If the processor specific annotations are directly associated with the independent annotations, no numbering of the annotations need be done.

At a different level of abstraction, two different types of edges comprise opportunities for optimization, and constraints on optimizations. The opportunities for optimizations edges identify potential global redundancy elimination, loop optimization and scheduling of machine instructions to exploit parallelism. The constraint edges identify output dependencies and anti dependencies within a region. A set of classes may be used to define such edges as will be apparent to one of skill in the computer programming arts from the description herein. Having described representative embodiments thereof, I claim as my invention:

What is claimed is:

1. A method of compiling a source program prepared in a source language for multiple different processors, the method comprising:
   converting the textual source program into an intermediate program comprised of generic abstraction machine instructions that are independent of any particular processor architecture; and
   generating and embedding a compact processor-independent graph structure in an extended static single assignment (SSA) form, comprising a plurality of machine independent annotations in the intermediate program and alias information identifying potential optimizations for use by an optimizing translator at a target processor.

2. The method of claim 1 wherein the machine independent annotations comprises use-definition edges of a graph.

3. The method of claim 2 and further comprising tracing possible execution paths between endpoints of an edge to ensure values are not affected.

4. The method of claim 1 wherein the use-definition edges employed herein follow at least one of operators, functions, pointers, or any arbitrarily complex expression.

5. A medium containing computer-readable instructions and data for causing a computer to perform the method of claim 1.

6. The method of claim 1 and further comprising generating machine dependent annotations identifying selected machine independent annotations for use with selected machines.

7. The method of claim 6 and further comprising distributing the intermediate program and the annotations to a plurality of user computer systems.

8. The method of claim 7 where distributing the intermediate program and the annotations comprises packaging them together prior to distribution.

9. The method of claim 8 where the intermediate program and the annotations are distributed via a physical package transferred to users as a single unit.

10. The method of claim 8 where the intermediate program and the annotations are distributed together over a network.

11. The method of claim 1 wherein the machine independent annotations hold locations of definitions and of uses for the program entities.

12. The method of claim 11 where optimizing comprises improving use of the resources of each target processor.

13. The method of claim 12 where optimizing includes improving use of architected registers.

14. The method of claim 11 where optimizing includes unrolling loops.

15. The method of claim 11 where optimizing includes enhancing exploitation of instruction level parallelism.

16. The method of claim 11 where optimizing includes strength reduction, linear test replacement, and induction variable substitution.

17. The method of claim 1 where the annotations include information relating to the definitions and uses of entities of the intermediate program.

18. The method of claim 1, wherein the graph structure in extended SSA form captures all alias relationships in the source program.

19. The method of claim 1, wherein the graph structure in extended SSA form encodes a plurality of types of edges for all alias relationships.

20. A method of compiling a source program prepared in a source language for multiple different processors, the method comprising:
   identifying potential optimizations in the program which are machine independent; and
   generating and embedding a compact processor-independent graph structure in an extended static single assignment (SSA) form, comprising a plurality of graph based annotations and alias information identifying the potential optimizations into the program for use by an optimizing translator at one of multiple different target processors.

21. The method of claim 20 where the optimizations are selected from a group consisting of improving use of architected register, unrolling loops, and exploiting instruction level parallelism.

22. The method of claim 20, wherein the graph structure in extended SSA form captures all alias relationships in the source program.

23. The method of claim 20, wherein the graph structure in extended SSA form encodes a plurality of types of edges for all alias relationships.

24. A medium having computer executable instructions stored thereon for causing a computer to perform a method of compiling a source program prepared in a source language for multiple different processors, the method comprising:
   identifying potential optimizations in the program which are machine independent; and
   generating and embedding a plurality of graph based annotations identifying the potential optimizations into the program for use by an optimizing translator at one of multiple different target processors.

25. A method of compiling a program for one of multiple different processors, comprising:
   receiving a program written in an intermediate language;
   receiving a compact graph structure in an extended static single assignment (SSA) form, comprising a set of machine independent and machine dependent annotations and alias information identifying optimizations for the program;
   generating an object code program from the intermediate language program based on the graph structure in the extended SSA form comprising the set of annotations; and optimizing the object code program for the one processor of multiple different target processors.

26. A medium containing computer-readable instructions and data for carrying out the method of claim 25.

27. The method of claim 25 where the intermediate program and the set of annotations are received as a single package.

28. The method of claim 27 where the intermediate program and the annotations are received at the same time over a network.

29. The method of claim 25 wherein the machine dependent annotations includes information relating the definitions and uses of entities in the intermediate program with respect to the architecture of one of the multiple different processors.

30. The method of claim 25 where the intermediate language program is a parse tree having a plurality of nodes specifying entities derived from a source program.

31. The method of claim 30 where optimizing the object code program comprises assigning resources of the particular processor to the program entities in response to the selected annotations.

32. The method of claim 25, wherein the graph structure in extended SSA form captures all alias relationships in the program.

33. The method of claim 25, wherein the graph structure in extended SSA form encodes a plurality of types of edges for all alias relationships.

34. A system for compiling a source program written in a high-level source language, comprising:
- a compiler that translates the source program to an intermediate program in an intermediate language substantially independent of the structure of any particular processor and generates a compact graph structure in an extended static single assignment (SSA) form to annotate the intermediate program with processor independent information and processor dependent information and alias information; and
- a plurality of virtual machines for translating the intermediate program into an object program in a low-level object language, the object program being optimized for one of a plurality of different processors in response to the processor-dependent information in a selected one of the annotations.

35. The system of claim 34 further including a plurality of user computer systems having processors of different architectures respectively associated with the translating virtual machines.

36. The system of claim 34 where the low-level object programs are directly executable on their respective processors.

37. The system of claim 34, wherein the graph structure in extended SSA form captures all alias relationships in the source program.

38. The system of claim 34, wherein the graph structure in extended SSA form encodes a plurality of types of edges for all alias relationships.

39. A system for compiling a program written in a high-level source language, comprising:
- a compiler having;
- a translator that translates the source program to an intermediate program in an intermediate language and generates a compact graph structure in an extended static single assignment (SSA) form having annotations and alias information representing potential code optimizations that are independent of the resources of any particular processor, and
- a generator that produces a set of machine dependent annotations containing information concerning the use of the potential code optimizations with respect to the resources of architecturally different processors.

40. The system of claim 39 where the annotations hold locations of definitions and of uses for the program entities.

41. The system of claim 39 where the intermediate program is a parse tree having a plurality of nodes.

42. The system of claim 39, wherein the graph structure in extended SSA form captures all alias relationships in the program.

43. The system of claim 39, wherein the graph structure in extended SSA form encodes a plurality of types of edges for all alias relationships.

44. A system for executing a program, comprising:
- an intermediate program in a tokenized language containing;
- a set of annotations containing optimization information related to the intermediate program, a portion of which is independent, and portion of which is dependent upon the resources of one of a plurality of different processors; and
- a translator that translates the intermediate program into an object program in a low-level object language executable on one particular processor as a function of the annotations such that the executable is optimized for that particular processor.

45. The system of claim 44 and further comprising storage for holding the intermediate program and the annotations.

46. The system of claim 44 where the annotations contains information concerning locations of definitions and uses of entities within the intermediate program.

47. The system of claim 46 where the translator comprises an optimizer that assigns the entities to specific resources of the one particular processor in accordance with the processor dependent annotations.

48. The system of claim 44 where the translator is driven by a function table.

49. The system of claim 48 where the function table contains a plurality of entries each specifying the name and the definition of a function executed by the optimizer.

50. The system of claim 48, wherein the processor dependent annotations point to entries in the function table.

51. The system of claim 44, wherein the graph structure in extended SSA form captures all alias relationships in the program.

52. The system of claim 44, wherein the graph structure in extended SSA form encodes a plurality of types of edges for all alias relationships.

53. A medium containing computer-readable instructions and data for carrying out a method of compiling a program for multiple different processors, the method comprising:
- receiving the program in source code;
- parsing the source code into a program in an intermediate language that includes optimization information which identifies definitions and uses of entities, and is neutral as to the resources of any of the multiple processors; and
- generating a separate set of annotations relating the definitions and uses of entities in the intermediate program, each of the annotations relating the entities of the intermediate-language program to the specific resources of any targeted hardware architecture of multiple different target architectures.

54. A medium containing computer-readable instructions and data for carrying out a method of compiling a program for one of multiple different processors, the method comprising:

receiving a program in an intermediate language;

receiving a set of annotations relating the definitions and uses of entities in the intermediate program that is neutral as to the resources of any of the multiple processors;

selecting one of the annotations corresponding to the one processor; and translating the intermediate-language program into an object-language executable program in an optimized form on the one processor of multiple different target processors based upon the selected annotation.

55. A computer-readable medium containing computer-readable representations of:

an intermediate program containing optimization information that is substantially independent of the resources of any of a set of specific processors; and a set of annotations for the intermediate program, each annotation comprising information concerning the structure of the intermediate program with respect to the resources of one of the specific processors of multiple different target processors for executing the program.

56. A computer program stored on a medium, the program comprising:

computer program instructions for execution on a computer processor; and a data structure comprising:

processor independent computer program annotations that identify potential optimizations for the computer program instructions; and processor dependent annotations that identify processor independent optimizations for selected processors of multiple different target processors.

57. The computer program of claim 56 wherein the processor independent annotations are embedded into the computer program instructions as edges of a graph.

58. The computer program of claim 57 wherein the edges of the graph are identified by a unique identifier.

59. The computer program of claim 58 wherein the processor dependent annotations identify relevant edges for each processor by use of the unique identifier of each edge.

60. A method of compiling a source program prepared in a source language for multiple different processors, the method comprising:

converting the textual source program into an intermediate program comprised of generic abstraction machine instructions that are independent of any particular processor architecture; and generating and embedding a compact processor-independent graph structure in an extended static single assignment (SSA) form, comprising a plurality of machine independent annotations in the intermediate program and alias information identifying potential optimizations and constraints for use by an optimizing translator at one of multiple different target processors.

61. The method of claim 60 wherein the optimizations are selected from the group 5 consisting of global redundancy elimination, loop optimization and scheduling machine instructions to exploit parallelism.

62. The method of claim 60 wherein the constraints are selected from the group consisting of output constraints and anti dependency constraints.

63. The method of claim 60 and further comprising generating machine dependent annotations to identify optimizations and constraints that apply to specific machines.

64. A computer readable medium having instructions stored thereon to cause a computer to implement the method of claim 60.

65. The method of claim 60, wherein the graph structure in extended SSA form captures all alias relationships in the source program.

66. The method of claim 60, wherein the graph structure in extended SSA form encodes a plurality of types of edges for all alias relationships.

67. A system having computer-readable instructions for causing a computer to compile a source program prepared in a source language for multiple different processors, the system comprising:

means for converting the textual source program into an intermediate program comprised of generic abstraction machine instructions that are independent of any particular processor architecture; and means for generating and embedding a compact processor-independent graph structure in an extended static single assignment (SSA) form, comprising a plurality of machine independent annotations in the intermediate program and alias information identifying potential optimizations and constraints for use by an optimizing translator at multiple different target processors.

68. The system of claim 67, wherein the graph structure in extended SSA form captures all alias relationships in the source program.

69. The system of claim 67, wherein the graph structure in extended SSA form encodes a plurality of types of edges for all alias relationships.

70. A computer-readable medium containing computer-readable representations of:

an intermediate program containing optimization and constraint information that is substantially independent of the resources of any of a set of specific processors; and a set of annotations for the intermediate program, each annotation comprising information concerning the structure of the intermediate program with respect to the resources of one of the specific processors for executing the program.

71. The method of claim 70 wherein the optimization is selected from the group consisting of global redundancy elimination, loop optimization and scheduling machine instructions to exploit parallelism, and wherein the constraint is selected from the group consisting of output constraints and anti dependency constraints.

72. A computer program stored on a medium, the program comprising:

computer program instructions for execution on a computer processor; and a data structure comprising a compact graph structure in an extended static single assignment (SSA) form, comprising:

alias information;

processor independent computer program annotations that identify potential optimizations and constraints for the computer program instructions; and processor dependent annotations that identify processor independent optimizations for selected processors.

73. The computer program of claim 72, wherein the graph structure in extended SSA form captures all alias relationships in the program.

74. The computer program of claim 72, wherein the graph structure in extended SSA form encodes a plurality of types of edges for all alias relationships.

* * * * *